(12) United States Patent
Wu

(10) Patent No.: US 12,049,281 B2
(45) Date of Patent: Jul. 30, 2024

(54) FOLDABLE STROLLER

(71) Applicant: JIAXING XIAOHUZI BIKE FACTORY COMPANY LIMITED, Jiaxing (CN)

(72) Inventor: Chunhua Wu, Jiaxing (CN)

(73) Assignee: JIAXING XIAOHUZI BIKE FACTORY COMPANY LIMITED (CN)

( * ) Notice: Subject to any disclaimer, the term of this patent is extended or adjusted under 35 U.S.C. 154(b) by 554 days.

(21) Appl. No.: 17/437,302

(22) PCT Filed: Apr. 15, 2019

(86) PCT No.: PCT/CN2019/082606
§ 371 (c)(1),
(2) Date: Sep. 8, 2021

(87) PCT Pub. No.: WO2020/210927
PCT Pub. Date: Oct. 22, 2020

(65) Prior Publication Data
US 2022/0177068 A1    Jun. 9, 2022

(51) Int. Cl.
*B62K 9/02*      (2006.01)
*B62B 7/04*      (2006.01)
(Continued)

(52) U.S. Cl.
CPC .............. *B62K 9/02* (2013.01); *B62K 15/006* (2013.01); *B62B 7/042* (2013.01); *B62B 7/044* (2013.01); *B62B 7/06* (2013.01)

(58) Field of Classification Search
CPC .... B62K 15/008; B62K 15/00; B62K 15/006; B62K 9/02; B62B 7/044; B62B 7/08; B62B 7/06; B62B 7/042
See application file for complete search history.

(56) References Cited

U.S. PATENT DOCUMENTS 6,032,971 A * 3/2000 Herder ................. B62K 15/008
                                                                  280/278
6,152,473 A * 11/2000 Shih ........................ B62K 9/02
                                                                  280/278
(Continued)

FOREIGN PATENT DOCUMENTS

CH            702262 A1 *  5/2011   ............. B62K 13/08
CN          202080391       12/2011
(Continued)

*Primary Examiner* — Emma K Frick
(74) *Attorney, Agent, or Firm* — Sand, Sebolt & Wernow Co., LPA

(57) ABSTRACT

A foldable baby stroller movable between unfolded and folded states. The stroller includes a frame, a front wheel assembly on a front portion of the frame including a front wheel, a rear wheel assembly on a rear portion of the frame including two rear wheels, and a seat assembly on an upper portion of the frame. The frame includes a head tube; at least one beam having a first end pivotally connected to the head tube; at least one joint, to which a second end of the beam is pivotally connected; and at least two rear fork rods having a first end pivotally connected to the joint and a second end connected to the rear wheel assembly. Parts of the foldable baby stroller do not need to be detached during folding, thereby implementing "one-click" folding, and making the operation more convenient and efficient.

12 Claims, 13 Drawing Sheets

(51) Int. Cl.
  *B62B 7/06*  (2006.01)
  *B62K 15/00*  (2006.01)

(56) References Cited

U.S. PATENT DOCUMENTS

| | | | | |
|---|---|---|---|---|
| 6,799,771 | B2 * | 10/2004 | Bigot | B62K 15/008 |
| | | | | 280/278 |
| 6,935,649 | B2 * | 8/2005 | Lim | B62H 7/00 |
| | | | | 280/282 |
| 8,308,178 | B2 * | 11/2012 | Hoerdum | B62K 15/008 |
| | | | | 280/278 |
| 8,844,960 | B2 * | 9/2014 | Young | B62K 15/00 |
| | | | | 280/278 |
| 9,321,499 | B2 * | 4/2016 | Kim | B62K 9/00 |
| 9,580,131 | B1 * | 2/2017 | Wu | B62K 9/02 |
| 10,150,528 | B2 * | 12/2018 | Kano | B62K 15/008 |
| 10,933,938 | B2 * | 3/2021 | Mazar | B62B 7/042 |
| 11,052,932 | B2 * | 7/2021 | DeBry | B62K 15/006 |
| 2018/0022413 | A1 * | 1/2018 | Kim | B62K 21/24 |
| | | | | 280/282 |

FOREIGN PATENT DOCUMENTS

| | | | | |
|---|---|---|---|---|
| CN | 203638020 | | 6/2014 | |
| CN | 105480342 | | 4/2016 | |
| CN | 105501364 | A * | 4/2016 | B62K 11/02 |
| CN | 205469519 | | 8/2016 | |
| CN | 206664822 | | 11/2017 | |
| CN | 108674550 | A * | 10/2018 | B62K 15/006 |
| CN | 117401073 | A * | 1/2024 | |
| JP | 3216724 | | 6/2018 | |
| TW | 568062 | | 12/2003 | |
| WO | WO-2010093178 | A2 * | 8/2010 | B62K 15/008 |

* cited by examiner

FOLDABLE STROLLER

TECHNICAL FIELD

The present application relates to a baby stroller, in particular, to a foldable baby stroller.

BACKGROUND

Currently, the baby stroller (such as a child tricycle) in the market mainly includes: a frame body, a front fork connected to the frame body, a front wheel mounted to the front fork, a rear wheel frame connected to opposite sides of the frame body, two rear wheels mounted to the rear wheel frame, a seat assembly disposed on the frame body, and a steering assembly disposed on the frame body. If necessary, a push rod assembly for being used by an adult can also be provided. The frame body of the child tricycle is unfoldable, so the longitudinal size thereof cannot be changed. Therefore, the child tricycle has a relatively large size and is very inconvenient in terms of transportation and packaging. Some people have also developed foldable child tricycles, but parts of the child tricycle often need to be detached, making the operation inconvenient, and the size of the folded child tricycle is still relatively large.

Granted Chinese patent CN105480342B, filed by the same applicant as the present application on Apr. 13, 2016, relates to a foldable child tricycle and a folding method thereof. The child tricycle has an unfolded state and a folded state, where the frame includes an upper link assembly, a lower link assembly, a head tube, and a support rod, which together form a four-link mechanism, thereby folding and unfolding can be implemented. During folding, a locking device is unlocked, then the push rod assembly is lifted up to disengage from the upper and lower link assemblies, and then the push rod assembly is flipped such that the push rod assembly, a handlebar, the upper link assembly, and the lower link assembly move closer to each other, so as to implement the folding from top to bottom. The configuration can effectively reduce the size of the child tricycle for easy carrying, and can fold and unfold the child tricycle as needed. The contents of CN105480342B can be fully incorporated in the text for reference. The applicant expects to develop a novel child tricycle based on this, so as to realize more convenient folding and unfolding operations as well as more compact folded size.

BRIEF SUMMARY

In view of the above problem, an object of the present invention is to provide a foldable baby stroller which has more convenient folding and unfolding operations and has a more compact folded size.

In order to achieve the above-said object, the present invention provides a foldable baby stroller having an unfolded state and a folded state, the foldable baby stroller comprising: a frame body, a front wheel assembly disposed on a front portion of the frame body and including at least one front wheel, a rear wheel assembly disposed on a rear portion of the frame body and including at least two rear wheels, and a seat assembly disposed on an upper portion of the frame body, wherein the frame body comprises: a head tube; at least one beam having a first end pivotally connected to the head tube and a second end; at least one joint, to which the second end of the beam is pivotally connected; and at least two rear fork rods having a first end pivotally connected to the joint and a second end connected to the rear wheel assembly.

Preferably, the at least one beam comprises a first beam and a second beam, the first end of each of the first beam and the second beam is pivotally connected to the head tube by means of at least one connecting block, the at least one joint comprises a first joint and a second joint which can be in contact with and be separated from each other, and the second end of each of the first beam and the second beam is pivotally connected to the first joint and the second joint.

Preferably, the first joint has a first upper pivot joint, a second upper pivot joint, and a third upper pivot joint, respectively, facing different directions, the second joint has a first lower pivot joint, a second lower pivot joint, and a third lower pivot joint, respectively, facing different directions, wherein the second end of the first beam is pivotally connected to the first joint by means of the first upper pivot joint, and the second end of the second beam is pivotally connected to the second joint by means of the first lower pivot joint.

Preferably, the foldable baby stroller further comprises a locking member, wherein the locking member locks the first joint and the second joint together during normal use, and when folding is to be performed, the locking member is released.

Preferably, the at least two rear fork rods comprise a first rear fork rod and a second rear fork rod, the first rear fork rod comprises a first upper rear fork rod and a first lower rear fork rod, and the second rear fork rod comprises a second upper rear fork rod and a second lower rear fork rod.

Preferably, the at least two rear fork rods comprise a first rear fork rod and a second rear fork rod, the first rear fork rod comprises a first upper rear fork rod and a first lower rear fork rod, the second rear fork rod comprises a second upper rear fork rod and a second lower rear fork rod, each of the rear fork rods has a first end and a second end, the first end of the first upper rear fork rod is pivotally connected to the first joint by means of the third upper pivot joint, the first end of the second upper rear fork rod is pivotally connected to the first joint by means of the second upper pivot joint, the first end of the first lower rear fork rod is pivotally connected to the second joint by means of the third lower pivot joint, the first end of the second lower rear fork rod is pivotally connected to the second joint by means of the second lower pivot joint, the second ends of the first upper rear fork rod and the first lower rear fork rod are pivotally connected to a rear wheel fixing part arranged on the inner side of one rear wheel, and the second ends of the second upper rear fork rod and the second lower rear fork rod are pivotally connected to a rear wheel fixing part arranged on the inner side of the other rear wheel.

Preferably, the foldable baby stroller further comprises a push rod assembly for providing guidance for folding of the foldable baby stroller.

Preferably, the at least one joint comprises a first joint and a second joint, the push rod assembly comprises a push rod, the first joint is slidable relative to the push rod, and the second joint is fixed relative to the push rod.

Preferably, the foldable baby stroller is a foldable child tricycle, and the foldable child tricycle comprises a front wheel disposed on the front portion of the frame body, two rear wheels disposed on the rear portion of the frame body, and a steering assembly disposed on the front portion of the frame body.

Preferably, the foldable child tricycle further comprises a pedal for driving the front wheel and/or a footrest fixed on the frame body.

Preferably, parts of the foldable child tricycle, after being folded, from bottom to top are: the rear wheel assembly, the frame body, the steering assembly, the front wheel assembly, and the seat assembly.

The present invention further provides a foldable frame for a foldable baby stroller, the frame comprising: a head tube; a first beam and a second beam, wherein the first beam and the second beam each has a first end and a second end, the first end of the first beam is pivotally connected to the head tube, and the first end of the second beam is pivotally connected to the head tube; a first joint and a second joint, wherein the first joint has a first upper pivot joint, a second upper pivot joint, and a third upper pivot joint, respectively, facing different directions, the second joint has a first lower pivot joint, a second lower pivot joint, and a third lower pivot joint, respectively, facing different directions, wherein the second end of the first beam is pivotally connected to the first joint by means of the first upper pivot joint, the second end of the second beam is pivotally connected to the second joint by means of the first lower pivot joint, and the first joint and the second joint can move toward or away from each other; and a first rear fork rod and a second rear fork rod, wherein the first rear fork rod comprises a first upper rear fork rod and a first lower rear fork rod, the second rear fork rod comprises a second upper rear fork rod and a second lower rear fork rod, each of the rear fork rods has a first end and a second end, the first end of the first upper rear fork rod is pivotally connected to the first joint by means of the third upper pivot joint, the first end of the second upper rear fork rod is pivotally connected to the first joint by means of the second upper pivot joint, the first end of the first lower rear fork rod is pivotally connected to the second joint by means of the third lower pivot joint, the first end of the second lower rear fork rod is pivotally connected to the second joint by means of the second lower pivot joint, the second ends of the first upper rear fork rod and the first lower rear fork rod are pivotally connected to a rear wheel fixing part arranged on the inner side of one rear wheel, and the second ends of the second upper rear fork rod and the second lower rear fork rod are pivotally connected to a rear wheel fixing part arranged on the inner side of the other rear wheel.

Preferably, the foldable frame further comprises a push rod assembly, wherein the push rod assembly comprises a telescopic push rod, the first joint is slidable relative to the push rod, and the second joint is fixed relative to the push rod.

Because of using the principle of a planar link mechanism, the parts of the foldable baby stroller of the present invention do not need to be detached during folding, thereby implementing "one-click" folding, and making the operation more convenient and efficient. Moreover, compared with the prior arts, the foldable baby stroller of the present invention has a more compact folded size, and in particular, has a significantly reduced longitudinal size.

DETAILED DESCRIPTION OF THE DISCLOSURE

Figure 1:
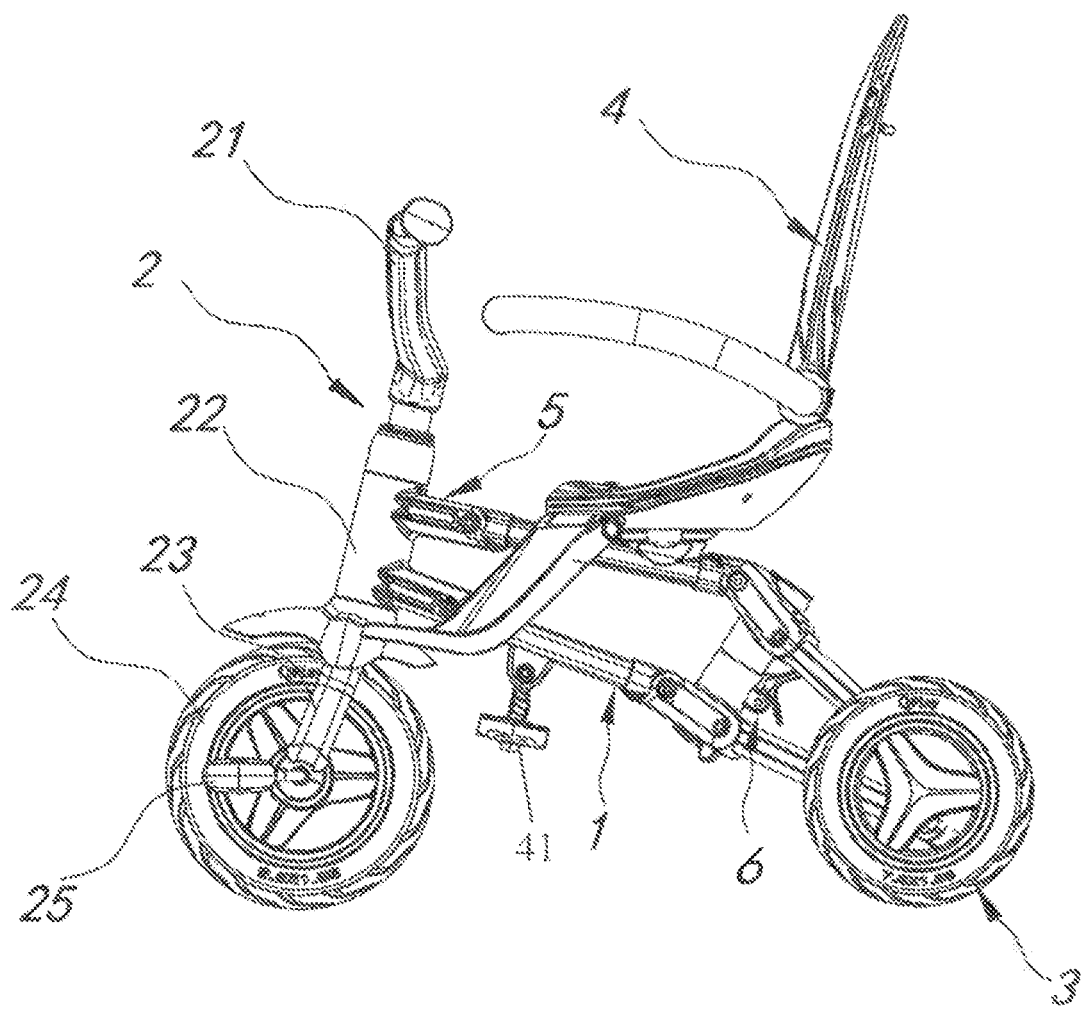
FIG. 1 is a side view of a child tricycle according to the first embodiment of the present invention, wherein the child tricycle is equipped with no push rod assembly.
Figure 2:
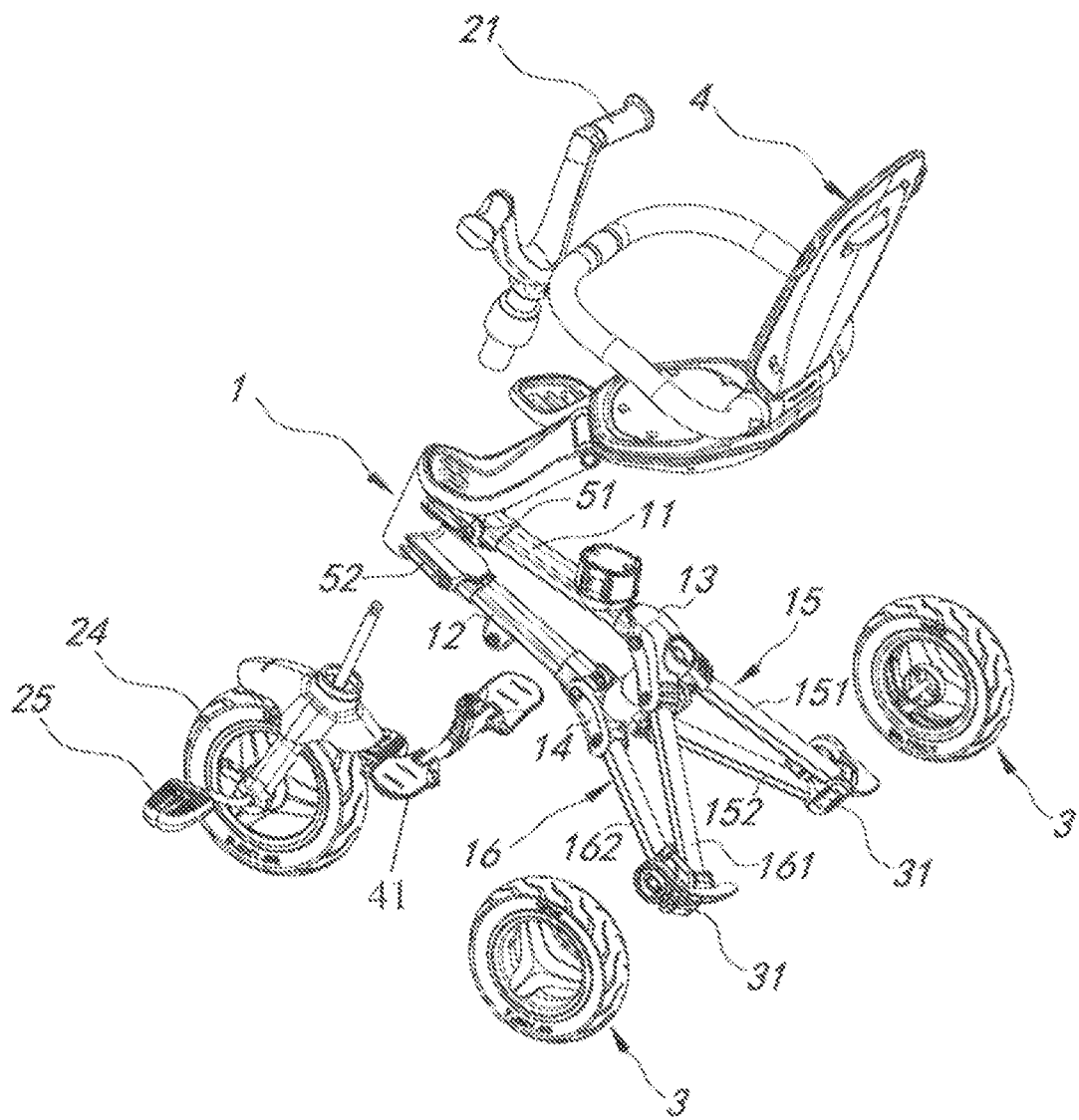
FIG. 2 is a perspective exploded view of the child tricycle shown in FIG. 1.
Figure 3:
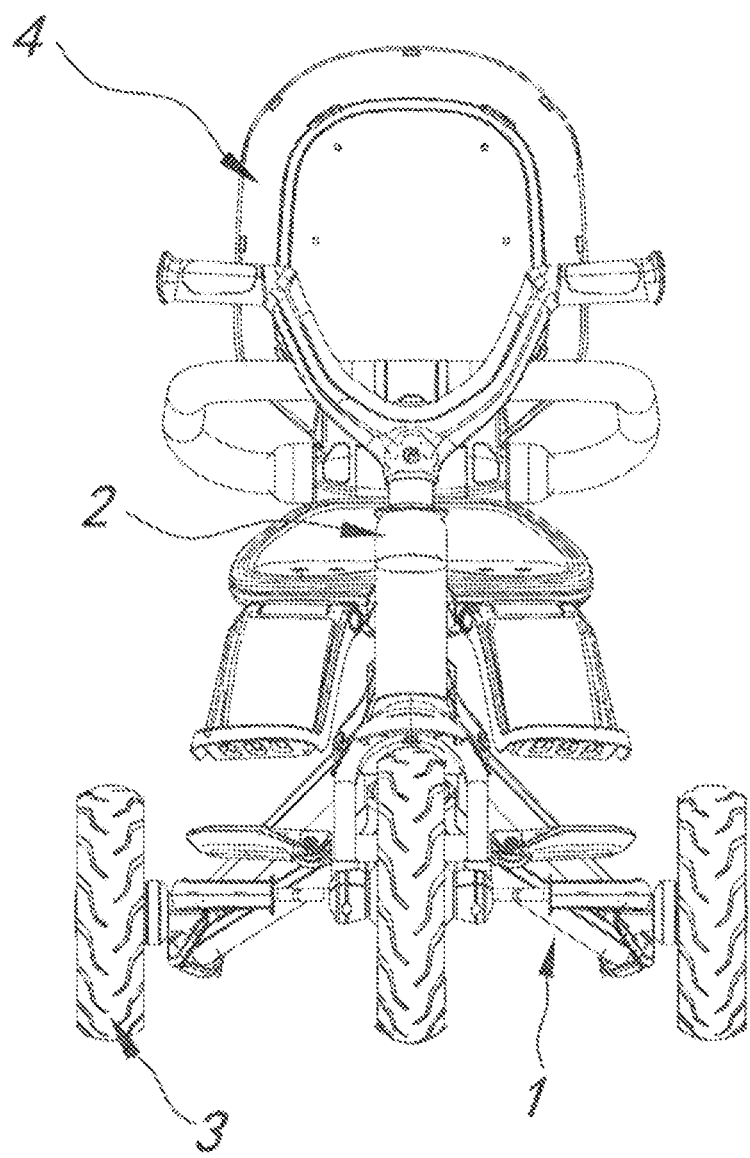
FIG. 3 is a front view of the child tricycle shown in FIG. 1.
Figure 4:
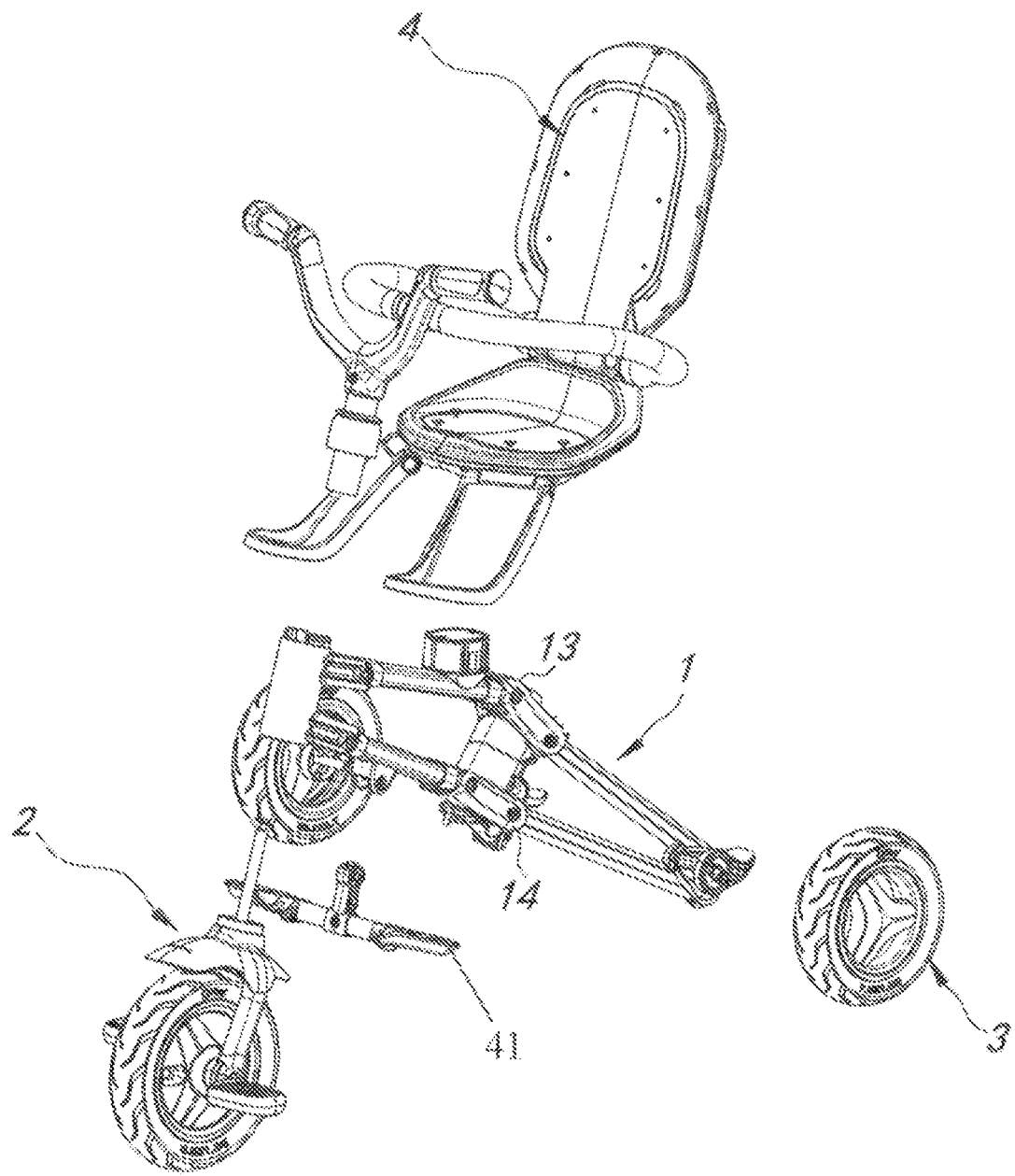
FIG. 4 is a perspective exploded view of the child tricycle shown in FIG. 1, which is viewed from another angle.

Preferable embodiments of the child tricycle according to the present invention are described below in detail with reference to the figures. In the figures, the same parts are represented by the same reference numerals. The terms "front", "rear", "upper", and "lower" used in the text merely indicate relative positional relationships and do not constitute specific limitations.

As shown in FIGS. 1-4, a child tricycle according to the first embodiment of the present invention includes: a frame body 1, a steering assembly 2 disposed on a front portion of the frame body 1, a front wheel assembly disposed on a front portion of the frame body 1 and including at least one front wheel 24, a rear wheel assembly disposed on a rear portion of the frame body 1 and including two rear wheels 3, and a seat assembly 4 disposed on an upper portion of the frame body 1.

The frame body 1 includes: a head tube 22, a first beam 11, a second beam 12, a first joint 13, a second joint 14, a first rear fork rod 15, and a second rear fork rod 16. The structure of the frame body 1 will be described in detail hereinafter.

The steering assembly 2 is inserted in the head tube 22 of the frame body 1. The steering assembly 2 includes a grip 21 for controlling a traveling direction of the child tricycle. More specifically, the steering assembly 2 is connected to a front fork 23. One end of the front fork 23 is also inserted in the head tube 22 of the frame body 1, and the other end of the front fork 23 is provided with the front wheel assembly. The front wheel 24 is driven by a pedal 25. A child, who is riding, can step on the pedal 25, while controlling the traveling direction of the child tricycle by means of the grip 21 of the steering assembly 2.

The seat assembly 4 is disposed on an upper portion of the frame body 1, and is preferably detachably mounted on a fixing base on the frame body 1. The seat assembly 4 may include, for example, surrounding assembly, backrest, etc., and these components are preferably pivotally foldable to facilitate the folding of the entire child tricycle. In addition, for more comfortable riding, a footrest 41 is fixedly provided on the frame body 1 for the riding child to rest the foot thereon.

Figure 5:
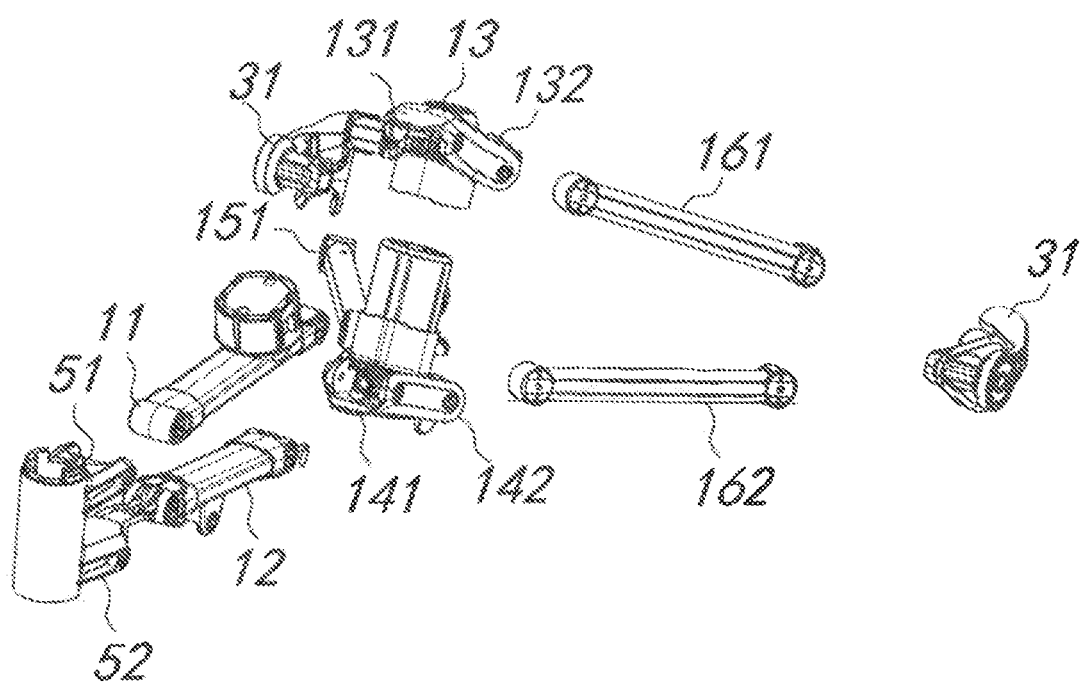
FIG. 5 is a perspective exploded view of a frame body.
Figure 6:
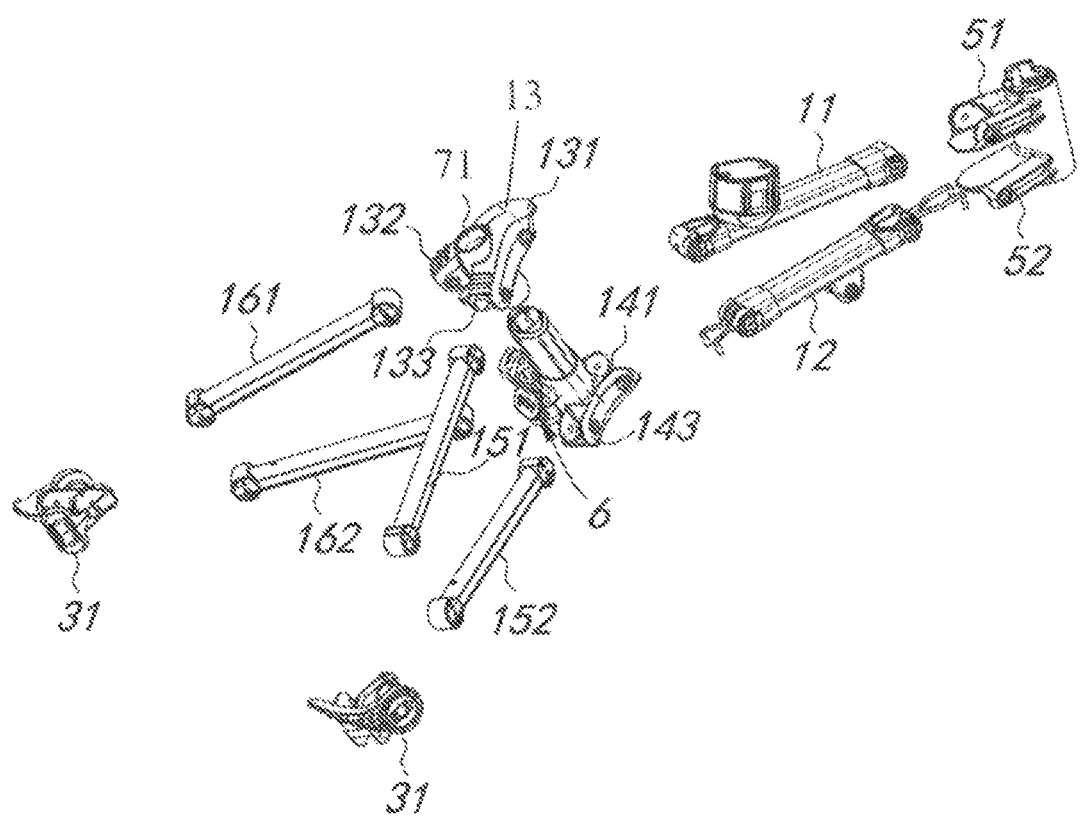
FIG. 6 is a perspective exploded view of the frame body, which is viewed from another angle.
Figure 7:
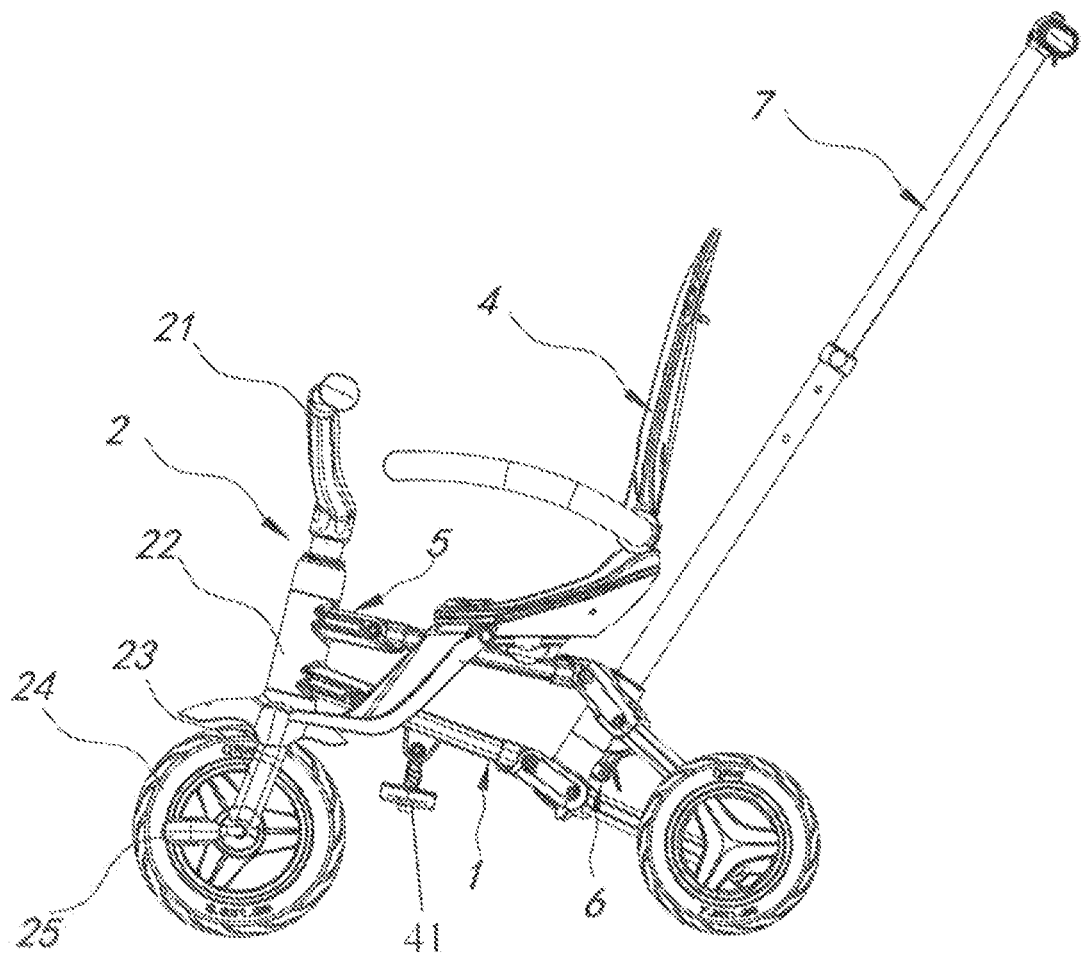
FIG. 7 is a side view of a child tricycle according to the second embodiment of the present invention, wherein the child tricycle is equipped with a push rod assembly.
Figure 8:
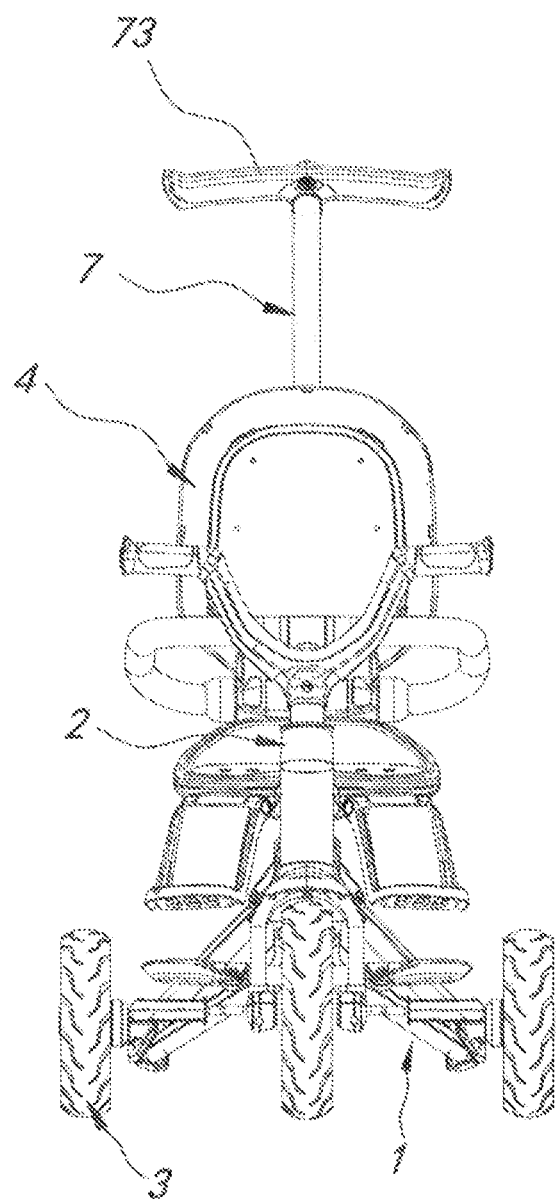
FIG. 8 is a front view of the child tricycle shown in FIG. 7.

The structure of the frame body 1 is described below in further detail with reference to FIGS. 5 and 6.

As shown in the figures, the first beam 11 and the second beam 12 each has a first end referred to as a front end and a second end referred to as a rear end. The head tube 22 is provided with a connecting block 5, and the connecting block 5 may include, for example, an upper connecting block 51 and a lower connecting block 52. The first end of the first beam 11 is pivotally connected to the head tube 22 by means of the upper connecting block 51. The first end of the second beam 12 is pivotally connected to the head tube 22 by means of the lower connecting block 52. The first joint 13 has a first upper pivot joint 131, a second upper pivot joint 132, and a third upper pivot joint 133, facing different directions, respectively. Similarly, the second joint 14 has a first lower pivot joint 141, a second lower pivot joint 142, and a third lower pivot joint 143, facing different directions, respectively. The second end of the first beam 11 is pivotally connected to the first joint 13 by means of the first upper pivot joint 131. The second end of the second beam 12 is pivotally connected to the second joint 14 by means of the first lower pivot joint 141.

The structures of the first rear fork rod 15 and the second rear fork rod 16 are basically the same. In this embodiment, the first rear fork rod 15 includes a first upper rear fork rod 151 and a first lower rear fork rod 152, and the second rear fork rod 16 includes a second upper rear fork rod 161 and a second lower rear fork rod 162. Each rear fork rod has a front end referred to as a first end and a rear end referred to as a second end. The first end of the first upper rear fork rod 151 is pivotally connected to the first joint 13 by means of the third upper pivot joint 133, and the first end of the second upper rear fork rod 161 is pivotally connected to the first joint 13 by means of the second upper pivot joint 132. The first end of the first lower rear fork rod 152 is pivotally connected to the second joint 14 by means of the third lower pivot joint 143, and the first end of the second lower rear fork rod 162 is pivotally connected to the second joint 14 by means of the second lower pivot joint 142. The second ends of the first upper rear fork rod 151 and the first lower rear fork rod 152 are pivotally connected to a rear wheel fixing part 31 arranged on the inner side of one rear wheel. The second ends of the second upper rear fork rod 161 and the second lower rear fork rod 162 are pivotally connected to a rear wheel fixing part 31 arranged on the inner side of the other rear wheel.

The first joint 13 and the second joint 14 can move toward or away from each other in a substantially vertical direction. Preferably, when the child tricycle is in a normal use state, the first joint 13 and the second joint 14 are in contact with each other; when the child tricycle is in a folded state, the first joint 13 and the second joint 14 are separated from each other. In addition, preferably a locking member 6 can be provided to lock the first joint 13 and the second joint 14 together during normal use. When folding is to be performed, the locking member 6 shall be released.

When the child tricycle according to the first embodiment of the present invention is to be folded, the locking member 6 is released, then the first joint 13 and the second joint 14 can be separated from each other by hands, so that the first beam 11, the first upper rear fork rod 151, and the second upper rear fork rod 161 move together with the first joint 13 in a first direction and gradually converge inwardly, and the second beam 12, the first lower rear fork rod 152, and the second lower rear fork rod 162 move together with the second joint 14 in a second direction which is opposite to the first direction and gradually converge inwardly. Finally, the frame body 1 is brought into a folded state, wherein the first beam 11, the first upper rear fork rod 151, the second upper rear fork rod 161, the second beam 12, the first lower rear fork rod 152, and the second lower rear fork rod 162 are close to each other and are substantially parallel to each other, thereby forming a compact folded state. Meanwhile, the remaining components (for example, the steering assembly 2 and the seat assembly 4) of the child tricycle are also sequentially folded inwardly with the folding movement of the frame body 1. In this way, the folding process of the entire child tricycle is completed.

When the child tricycle is to be unfolded from the folded state to the normal use state, the seat assembly 4 of the child tricycle can be unfolded firstly, and the steering assembly 2 and the first upper rear fork rod 151 or the second upper rear fork rod 161 can be held and unfolded outwardly by both hands. During the unfolding process, the first joint 13 and the second joint 14 move toward each other, so that the first beam 11, the first upper rear fork rod 151, the second upper rear fork rod 161, the second beam 12, the first lower rear fork rod 152, and the second lower rear fork rod 162 also move with the movement of the first joint 13 and the second joint 14 so as to be unfolded in position. Finally, the child tricycle can be brought into the normal use state by locking the locking member 6.

As mentioned below, parts or components of the folded child tricycle from bottom to top, respectively, are: the rear wheel assembly, the frame body 1, the steering assembly 2, the front wheel assembly, and the seat assembly 4.

The foldable child tricycle according to the second embodiment of the present invention will be described below with reference to FIGS. 7-13. Different from that in the first embodiment, the foldable child tricycle according to the second embodiment of the present invention further includes a push rod assembly 7. The push rod assembly 7 can be used by adults, just like a conventional push rod assembly. More importantly, in the present invention, the push rod assembly 7 also serves a further function of providing guidance for the folding of the child tricycle.

The push rod assembly 7 mainly includes a grip 73 and a push rod. The push rod is preferably telescopic. The first joint 13 is provided with a through hole 71 for the push rod to pass through, and the second joint 14 is provided with a connecting tube 72 that can be engaged with the push rod. Therefore, the first joint 13 is slidable relative to the push rod, and the second joint 14 is fixed relative to the push rod. The push rod has a proximal end (i.e., one end provided with the grip 73) and a distal end (i.e., the other end connected to the second joint 14).

The folding process of the child tricycle according to the second embodiment of the present invention is as follows. First, the push rod is shortened and the locking member 6 is released. Then, the first joint 13 and the second joint 14 are separated from each other by hands. Next, the first beam 11, the first upper rear fork rod 151, and the second upper rear fork rod 161 are moved together with the first joint 13 along the push rod to the proximal end of the push rod and gradually converge inwardly toward the push rod; Meanwhile, the second beam 12, the first lower rear fork rod 152, and the second lower rear fork rod 162 at the distal end of the push rod gradually converge from the second joint 14 toward the push rod. Finally, the frame body 1 is brought into a folded state, wherein the first beam 11, the first upper rear fork rod 151, the second upper rear fork rod 161, the second beam 12, the first lower rear fork rod 152, and the second lower rear fork rod 162 are close to the push rod and are substantially parallel to the push rod, thereby forming a compact folded state. Meanwhile, the remaining components (for example, the steering assembly 2 and the seat assembly 4) of the child tricycle are also sequentially folded inwardly with the folding movement of the frame body 1. In this way, the folding process of the entire child tricycle is completed.

Figure 9:
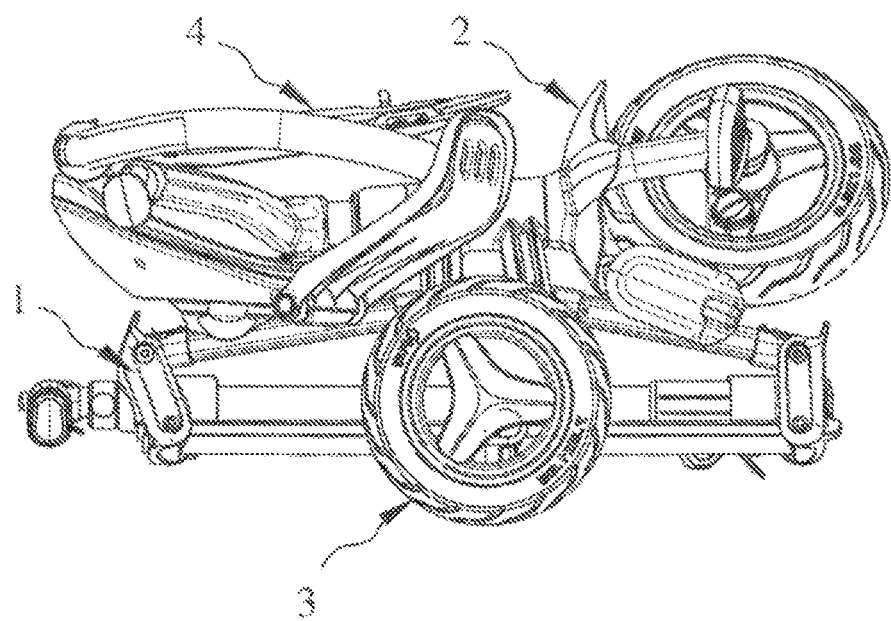
FIG. 9 is a perspective view of the child tricycle shown in FIG. 7, wherein the child tricycle is folded.
Figure 10:
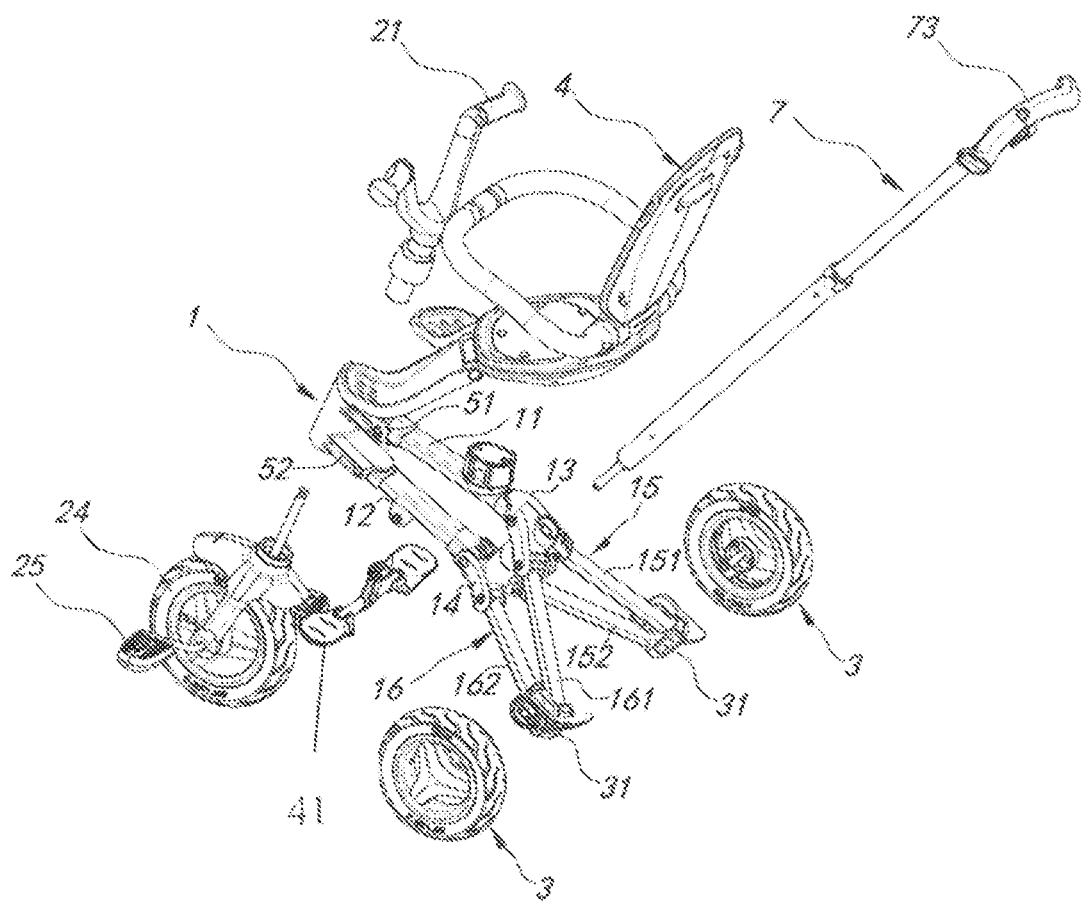
FIG. 10 is a perspective exploded view of the child tricycle shown in FIG. 7.
Figure 11:
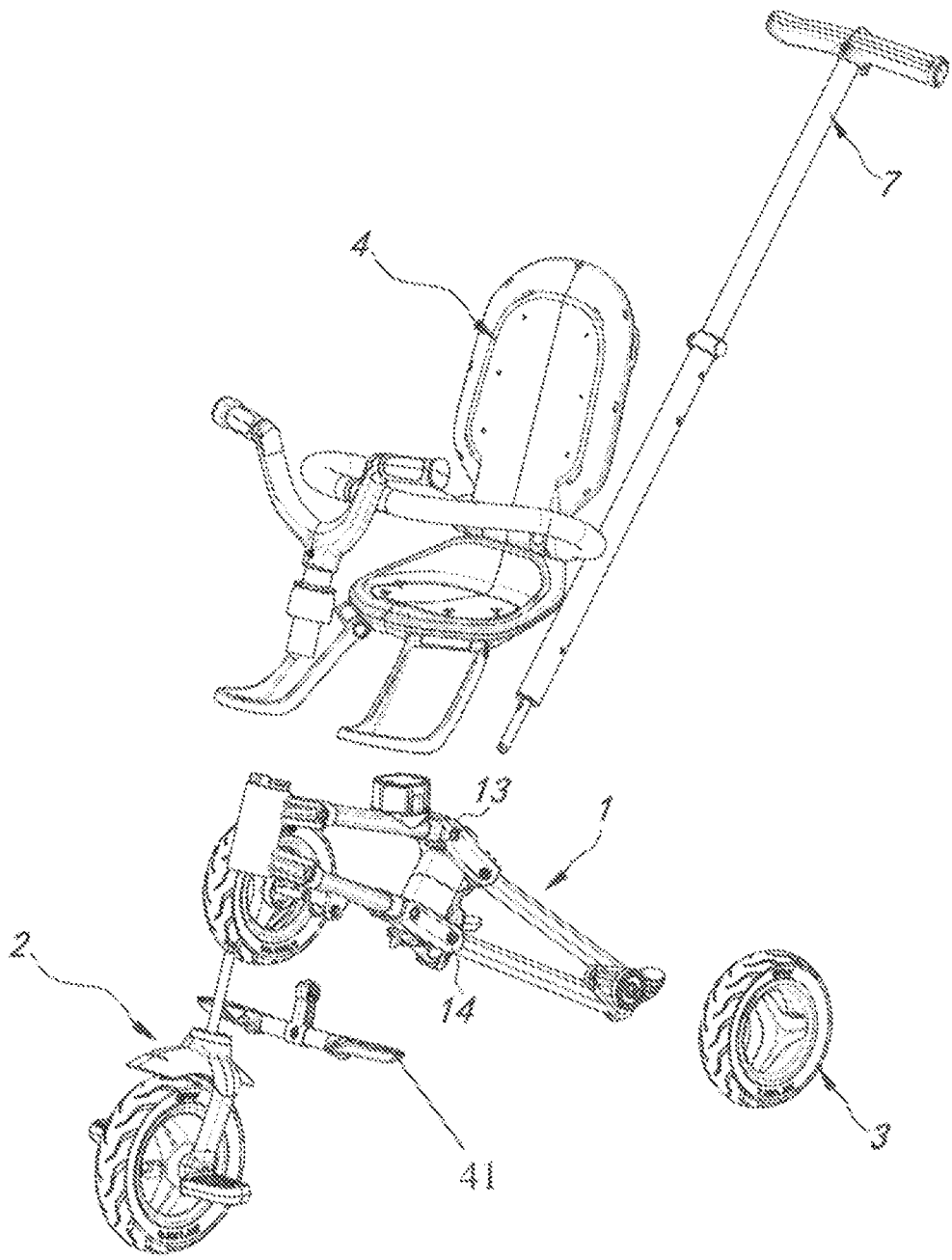
FIG. 11 is a perspective exploded view of the child tricycle shown in FIG. 7, which is viewed from another angle.
Figure 12:
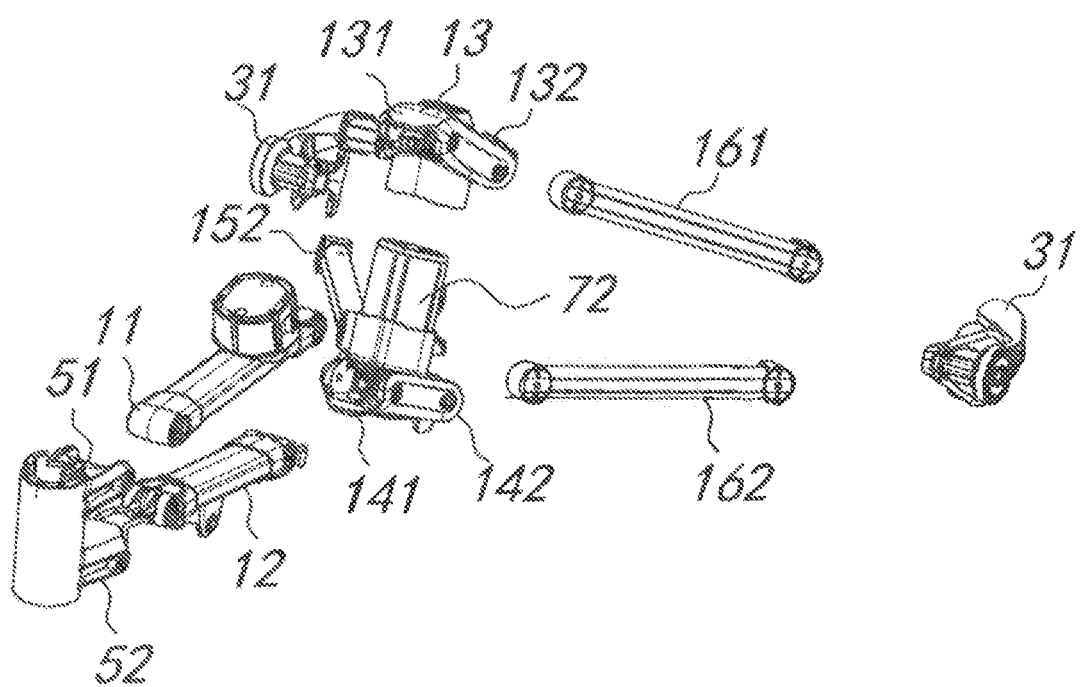
FIG. 12 is a perspective exploded view of a frame body according to the second embodiment of the present invention.
Figure 13:
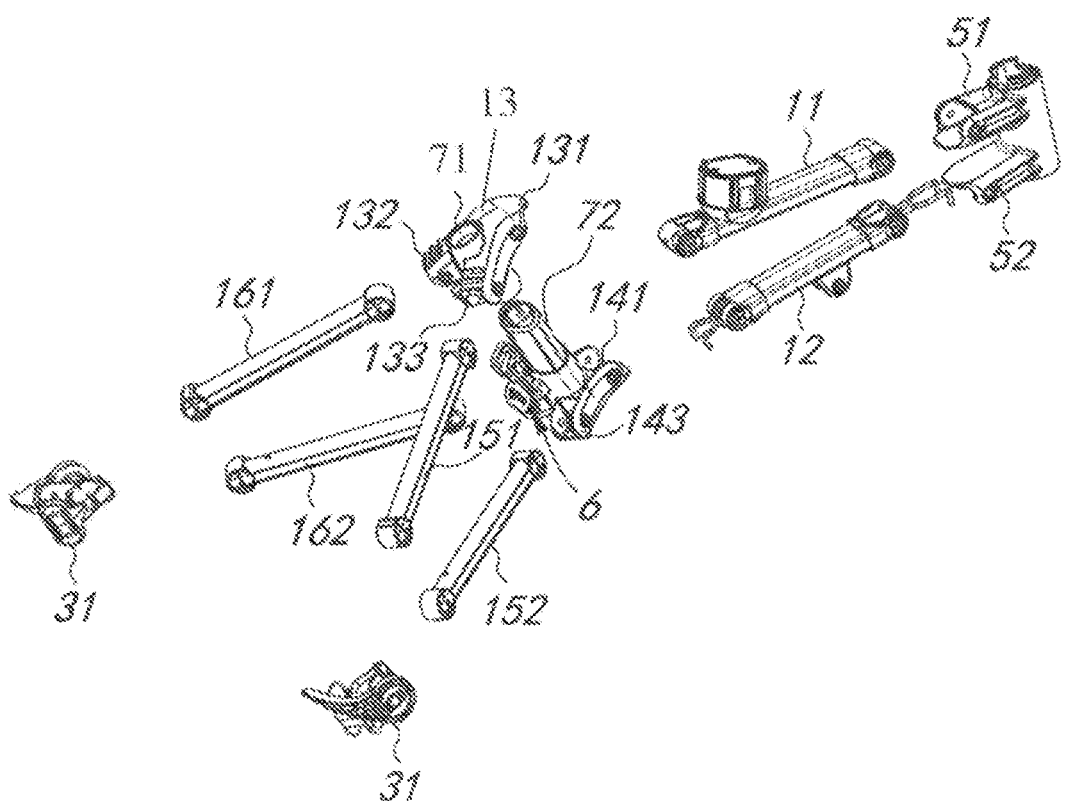
FIG. 13 is a perspective exploded view of the frame body according to the second embodiment of the present invention, which is viewed from another angle.

FIG. 9 shows the folded child tricycle. It can be seen from the figure that parts or components of the folded child tricycle from bottom to top, respectively, are: the rear wheel assembly, the frame body 1, the steering assembly 2, the front wheel assembly, and the seat assembly 4.

When the child tricycle is to be unfolded from the folded state to the normal use state, the seat assembly 4 of the child tricycle can be unfolded firstly, and the steering assembly 2 and the first upper rear fork rod 151 or the second upper rear fork rod 161 can be held and unfolded outwardly by both hands. During the unfolding process, the first joint 13 and the second joint 14 move toward each other, so that the first beam 11, the first upper rear fork rod 151, the second upper rear fork rod 161, the second beam 12, the first lower rear fork rod 152, and the second lower rear fork rod 162 also move with the movement of the first joint 13 and the second joint 14 so as to be unfolded in position. Finally, the child tricycle can be brought into the normal use state by locking the locking member 6.

The foldable child tricycle according to the preferred embodiment of the present invention is described above. It should be understood that the concept of the folding structure of the present invention is not limited to child tricycles, but can be more widely applied to other products, such as baby carriages or baby strollers. Correspondingly, one front wheel can be replaced by two or more front wheels; or the steering assembly and the pedal can be removed, and if necessary, at least one universal wheel can be used as the front wheel.

The frame body of the foldable baby stroller of the present invention is also changeable. For example, in the above embodiments, the first rear fork rod 15 including the first upper rear fork rod 151 and the first lower rear fork rod 152 or the second rear fork rod 16 including the second upper rear fork rod 161 and the second lower rear fork rod 162 can be replaced by a single rod or a single rod with a plurality of sections. For example, the first beam 11 and the second beam 12 in the above embodiments can also be simplified into one beam. In other words, configurations of one beam and two rear fork rods and of one beam and four or more rear fork rods can be formed.

The parts adopted in the present invention, such as the connecting block, the joint, the pivot joint, the locking member, and the like, are well known to those skilled in the art, but other arrangements may also be adopted. For example, in the above embodiments, the first ends of the first beam 11 and the second beam 12 are pivotally connected to two connecting blocks, respectively, however, the first ends of the first respectively 11 and the second respectively 12 can also be pivotally connected to one connecting block. It should be understood that the term "head tube" used herein should cover various connection structures.

Although the present invention is described in detail above, it should be understood that those skilled in the art could make various changes based on the above disclosure. Therefore, the protection scope of the present invention is limited merely by the appended claims.

The reference numerals are described as follows:
1: Frame body
2: Steering assembly
3: Rear wheel
4: Seat assembly
5: Connecting block
6: Locking member
7: Push rod assembly
11: First beam
12: Second beam
13: First joint
14: Second joint
15: First rear fork rod
16: Second rear fork rod
21: Grip
22: Head tube
23: Front fork
24: Front wheel
25: Pedal
31: Rear wheel fixing part
41: Footrest
51: Upper connecting block
52: Lower connecting block
71: Through hole
72: Connecting tube
73: Grip
131: First upper pivot joint
132: Second upper pivot joint
133: Third upper pivot joint
141: First lower pivot joint
142: Second lower pivot joint
143: Third lower pivot joint
151: First upper rear fork rod
152: First lower rear fork rod
161: Second upper rear fork rod
162: Second lower rear fork rod

What is claimed is:

1. A foldable baby stroller having an unfolded state and a folded state, the foldable baby stroller comprising:
a frame body;
a front wheel assembly disposed on a front portion of the frame body and including at least one front wheel;
a rear wheel assembly disposed on a rear portion of the frame body and including at least two rear wheels; and
a seat assembly disposed on an upper portion of the frame body;
wherein the frame body comprises:
a head tube;
at least one beam having a first end pivotally connected to the head tube and a second end;
at least one joint, to which the second end of the beam is pivotally connected; and
at least two rear fork rods having a first end pivotally connected to the joint and a second end connected to the rear wheel assembly;
wherein the at least one beam comprises a first beam and a second beam;
wherein the first end of each of the first beam and the second beam is pivotally connected to the head tube by at least one connecting block;
wherein the at least one joint comprises a first joint and a second joint which are one of in contact with each other and separated from each other; and
wherein the second end of each of the first beam and the second beam is pivotally connected to the first joint and the second joint.

2. The foldable baby stroller according to claim 1, wherein the first joint has a first upper pivot joint, a second upper pivot joint, and a third upper pivot joint, respectively, facing different directions;
- wherein the second joint has a first lower pivot joint, a second lower pivot joint, and a third lower pivot joint, respectively, facing different directions;
- wherein the second end of the first beam is pivotally connected to the first joint by the first upper pivot joint, and the second end of the second beam is pivotally connected to the second joint by means of the first lower pivot joint.

3. The foldable baby stroller according to claim 2, wherein the at least two rear fork rods comprise a first rear fork rod and a second rear fork rod, the first rear fork rod comprises a first upper rear fork rod and a first lower rear fork rod, the second rear fork rod comprises a second upper rear fork rod and a second lower rear fork rod, wherein each of the rear fork rods has a first end and a second end, wherein the first end of the first upper rear fork rod is pivotally connected to the first joint by the third upper pivot joint, the first end of the second upper rear fork rod is pivotally connected to the first joint by the second upper pivot joint, and the first end of the first lower rear fork rod is pivotally connected to the second joint by the third lower pivot joint, the first end of the second lower rear fork rod is pivotally connected to the second joint by means of the second lower pivot joint, the second ends of the first upper rear fork rod and the first lower rear fork rod are pivotally connected to a rear wheel fixing part arranged on an inner side of one rear wheel, and the second ends of the second upper rear fork rod and the second lower rear fork rod are pivotally connected to a rear wheel fixing part arranged on an inner side of the other rear wheel.

4. The foldable baby stroller according to claim 1, further comprising a locking member, wherein the locking member locks the first joint and the second joint together during normal use, and when folding is to be performed, the locking member is released.

5. The foldable baby stroller according to claim 1, wherein the at least two rear fork rods comprise a first rear fork rod and a second rear fork rod, the first rear fork rod comprises a first upper rear fork rod and a first lower rear fork rod, and the second rear fork rod comprises a second upper rear fork rod and a second lower rear fork rod.

6. The foldable baby stroller according to claim 1, further comprising a push rod assembly for providing guidance for folding of the foldable baby stroller.

7. The foldable baby stroller according to claim 6, wherein the at least one joint comprises a first joint and a second joint, the push rod assembly comprises a push rod, the first joint is slidable relative to the push rod, and the second joint is fixed relative to the push rod.

8. The foldable baby stroller according to claim 1, wherein the foldable baby stroller is a foldable child tricycle, and the at least one front wheel of the front wheel assembly on the foldable child tricycle comprises one front wheel disposed on the front portion of the frame body;
- wherein the at least two rear wheels of the rear wheel assembly comprises two rear wheels disposed on the rear portion of the frame body; and
- wherein a steering assembly is disposed on the front portion of the frame body.

9. The foldable baby stroller according to claim 8, wherein the foldable child tricycle further comprises a pedal for driving the front wheel and/or a footrest fixed on the frame body.

10. The foldable baby stroller according to claim 8, wherein parts of the foldable child tricycle, after being folded, from bottom to top are: the rear wheel assembly, the frame body, the steering assembly, the front wheel assembly, and the seat assembly.

11. A foldable frame for a foldable baby stroller, the frame comprising:
- a head tube;
- a first beam and a second beam, wherein the first beam and the second beam each has a first end and a second end, the first end of the first beam is pivotally connected to the head tube, and the first end of the second beam is pivotally connected to the head tube;
- a first joint and a second joint, wherein the first joint has a first upper pivot joint, a second upper pivot joint, and a third upper pivot joint, respectively, facing different directions, the second joint has a first lower pivot joint, a second lower pivot joint, and a third lower pivot joint, respectively, facing different directions, wherein the second end of the first beam is pivotally connected to the first joint by the first upper pivot joint, the second end of the second beam is pivotally connected to the second joint by the first lower pivot joint, and the first joint and the second joint is movable toward or away from each other; and
- a first rear fork rod and a second rear fork rod, wherein the first rear fork rod comprises a first upper rear fork rod and a first lower rear fork rod, the second rear fork rod comprises a second upper rear fork rod and a second lower rear fork rod, each of the rear fork rods has a first end and a second end, the first end of the first upper rear fork rod is pivotally connected to the first joint by the third upper pivot joint, the first end of the second upper rear fork rod is pivotally connected to the first joint by the second upper pivot joint, the first end of the first lower rear fork rod is pivotally connected to the second joint by the third lower pivot joint, the first end of the second lower rear fork rod is pivotally connected to the second joint by the second lower pivot joint, the second ends of the first upper rear fork rod and the first lower rear fork rod are pivotally connected to a rear wheel fixing part arranged on an inner side of one rear wheel, and the second ends of the second upper rear fork rod and the second lower rear fork rod are pivotally connected to a rear wheel fixing part arranged on an inner side of the other rear wheel.

12. The foldable frame according to claim 11, further comprising a push rod assembly, wherein the push rod assembly comprises a telescopic push rod, the first joint is slidable relative to the push rod, and the second joint is fixed relative to the push rod.

* * * * *